United States Patent

[11] 3,580,128

[72] Inventor Robert A. Leich
Southfield, Mich.
[21] Appl. No. 855,149
[22] Filed Sept. 4, 1969
[45] Patented May 25, 1971
[73] Assignee Camdex, Inc.
Detroit, Mich.

[54] AMMUNITION RELOADER
22 Claims, 4 Drawing Figs.
[52] U.S. Cl. .................................................. 86/31,
86/29
[51] Int. Cl. ..................................................... F42b 33/02
[50] Field of Search........................................... 86/31, 33,
29, 23, 20 (U)

[56] References Cited
UNITED STATES PATENTS
56,489 7/1866 Dodge et al................. 86/31
2,856,807 10/1958 Stutzman..................... 86/31

Primary Examiner—Benjamin A. Borchelt
Assistant Examiner—Jerald J. Devitt
Attorney—Barnard, McGlynn & Reising ABSTRACT: An automatic powder metering apparatus for loading ammunition including a powder slide, a cam for cyclically displacing the slide between a powder input position and a powder output position and means on the cam for cyclically pulsating the slide when in the two above-named positions to loosen the powder for correct feeding.

INVENTOR.
Robert A. Leich

INVENTOR.
Robert A. Leich

AMMUNITION RELOADER

This invention relates to ammunition loading apparatus and more particularly to an apparatus in which a powder slide is cyclically and abruptly pulsated both when receiving powder from a supply and when conveying powder to a cartridge or shell thereby to prevent improper metering due to powder packing or sticking in the metering apparatus.

The process of loading ammunition involves placing various components and materials in a cartridge or shell including firing caps, powder and wadding. It has been found that most defective loads result from the failure of the loading apparatus to meter the proper powder charge into the cartridge. Gun powder is a very fine substance which is susceptible to packing and sticking in the metering channels of a loading apparatus. In an automatic loading apparatus such sticking can result in the failure to meter the proper charge into a large number of cartridges which failure may remain undetected until an attempt is made to fire the cartridges. One approach to solving the powder packing and sticking problem is to continuously vibrate the powder supply during the operation of a loading apparatus. It has been found, however, that such constant and continuous vibration can actually contribute to the settling and packing of the powder in the supply container. Thus, such agitation may aggravate rather than solve the powder sticking and improper metering problem.

In accordance with the present invention the proper metering of powder in a loading apparatus is promoted by cyclically pulsating a powder metering element at predetermined points in the loading process. In general this is accomplished by abruptly and cyclically displacing a powder slide first when the slide is in a position for receiving powder from a supply and second when the slide is in a position to convey powder to a cartridge.

In one form, the invention includes a powder slide having a substantially vertically aligned aperture through which powder is conveyed by gravity and a control means for relatively slowly and cyclically displacing the powder slide between the first position wherein powder is conveyed to the aperture and a second position wherein powder is conveyed from the aperture to a cartridge. The control means, which may take the form of a cam, is provided with spaced means for abruptly and cyclically displacing the slide as it occupies the first and second positions thereby to insure correct feed into and out of the powder slide.

In a preferred embodiment of the invention the control means is a vertical cam having first and second offset portions, which cam is engaged by the slide during the operation of the loading apparatus. The cam is provided with spaced notches and spring plungers such that the powder slide is pulsated abruptly and cyclically upon reaching each of the notch-plunger combinations.

Another novel feature of the illustrated embodiment is the means for positively driving a powder slide or other reciprocating member between the powder receiving and conveying positions. This includes the vertical cam and a follower having parallel inclined contact surfaces which engagingly follow the obliquely oriented inclined cam section connecting the first and second offset vertical portions of the cam thereby positively forcing the powder slide forward and back during each cycle of the loading apparatus.

The invention as well as the particular features and advantages thereof may be best understood from a reading of the following specification which describes a specific and illustrative embodiment of the invention. This specification is to be taken with the accompanying drawings of which:

Figure 1:
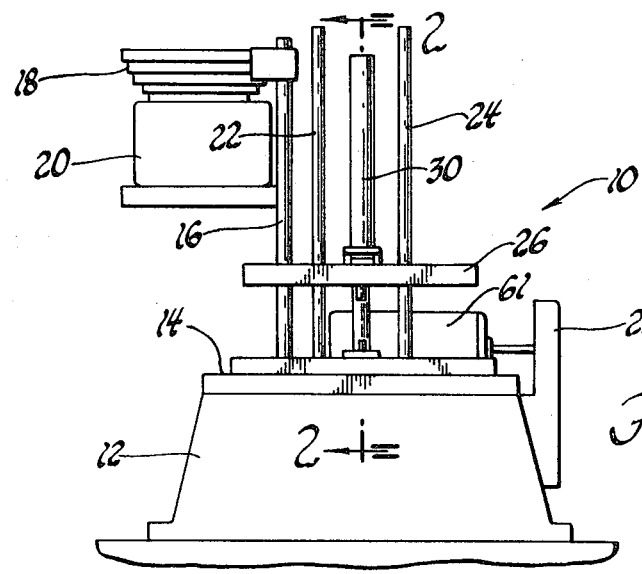
FIG. 1 is a front view of a reloading apparatus employing the invention.

Referring to FIG. 1, there is shown an automatic cartridge reloading machine 10 with which the present invention may be advantageously employed. The machine 10 comprises a heavy base 12 having a platform 14 which supports cartridges in a substantially upright position relative to a number of work stations at which the various steps in a cartridge reloading process are performed. A shaft 16 mounted on the base 12 carries a well-known cartridge feeding device 18 which is driven by a motor 20. Device 18 sequentially feeds cartridges into the shaft 16 whereupon such cartridges are dropped to the platform 14 in the upright position for the performance of the various reloading process steps. Platform 14 may support cartridge indexing means for moving the cartridges between work stations but such means forms no part of the present invention and is not illustrated in detail. Base 12 also supports a pair of vertical guide pins 22 and 24 along which a platen assembly 26 is vertically displaced by a motor 61 which operates through a chain drive 28 and cranking apparatus to be described. A vertically oriented powder supply tube 30 is mounted on the platen assembly 26 to supply powder to cartridges on the platform 14 in metered amounts in accordance with the operation of apparatus which will be subsequently described.

Figure 2:
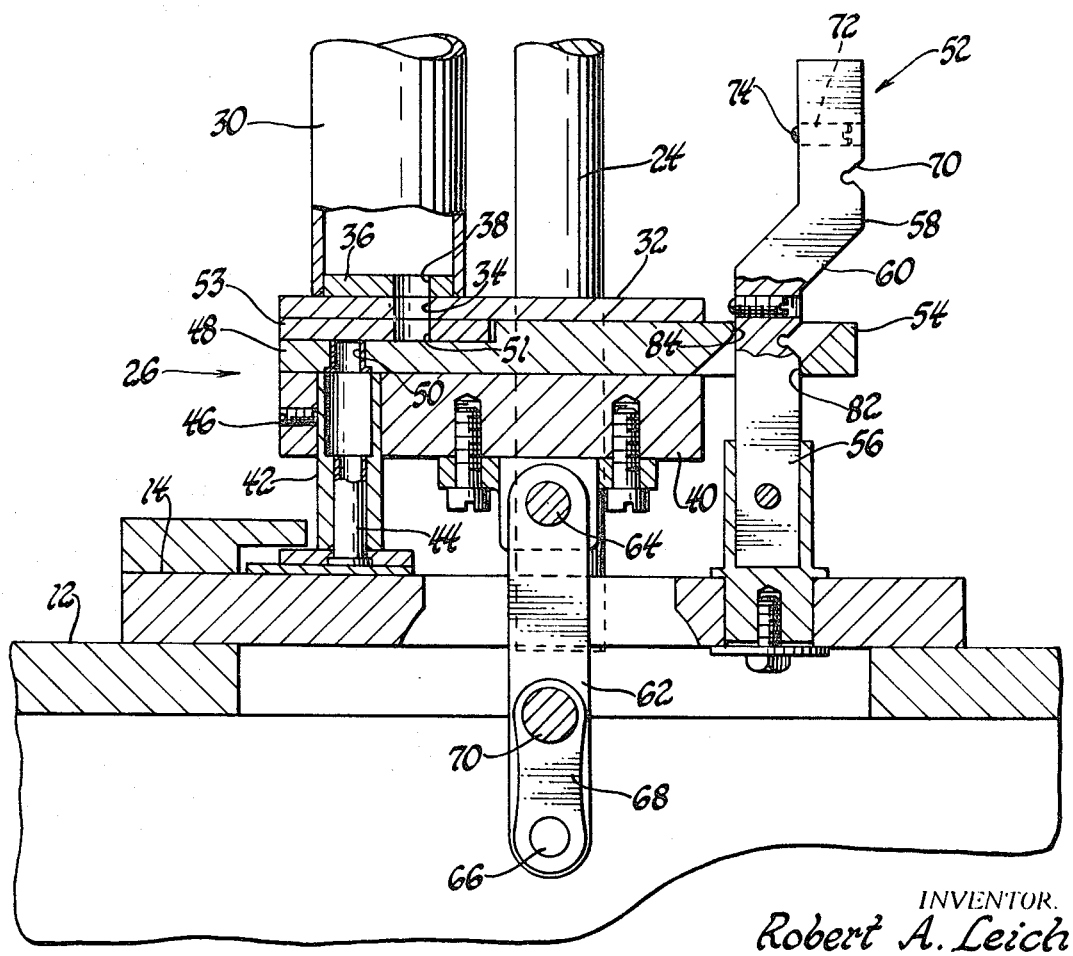
FIG. 2 is a side view in cross section of a specific embodiment of the invention in a powder discharging position.
Figure 3:
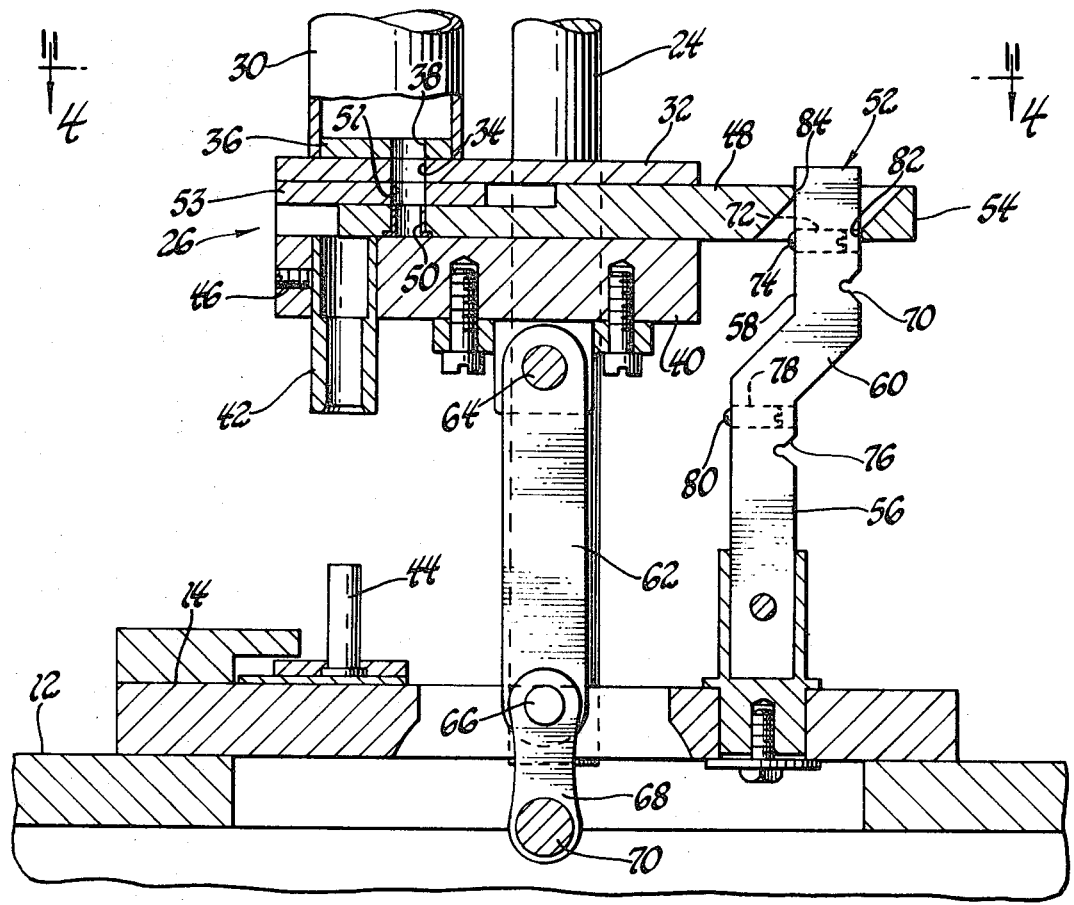
FIG. 3 is a side view in cross section of the FIG. 2 apparatus in a powder receiving position.
Figure 4:
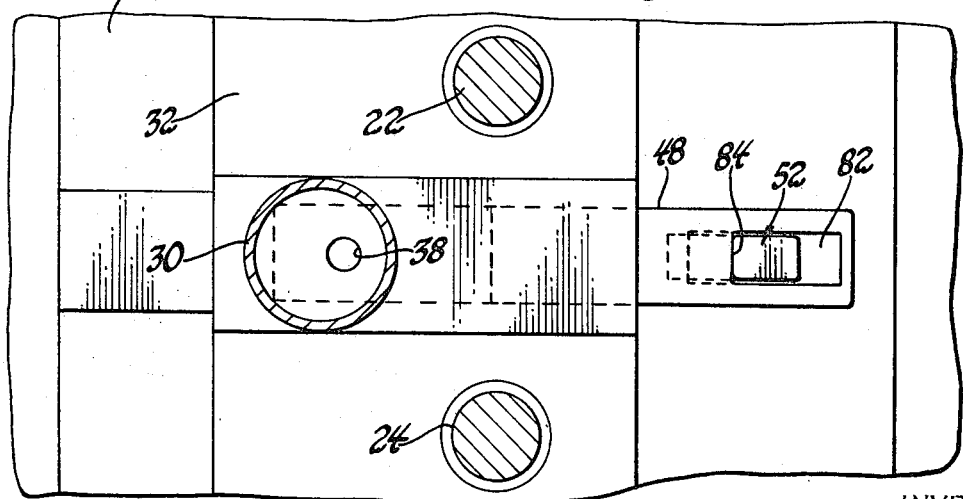
FIG. 4 is a plan view of the apparatus of FIG. 3 taken along the section line 4—4.

Referring to FIGS. 2 through 4, the platen assembly 26 and the control means for providing the proper displacements thereof are shown in greater detail. Platen assembly 26 comprises a first plate member 32 having a vertically aligned aperture 34 and being mounted for vertical sliding displacement along the guide pins 22 and 24. Mounted on the top surface of the plate 32 is a substantially disc-shaped member 36 which receives the cylindrical powder supply tube 30 thereon. The supply tube 30 is preferably made of clear plastic so that the quantity of powder therein can be constantly observed. Disc-shaped member 36 is provided with a vertically oriented aperture 38 which is aligned with the aperture 34 of the first plate member 32.

Platen assembly 26 further includes a second plate member 40 which is mounted on the guide pins 22 and 24 for sliding vertical displacement therealong. Plate member 40 is disposed parallel to and below the first plate member 32 and is also provided with a vertically oriented aperture within which is disposed a hollow cylindrical cartridge spool 42. Spool 42 is adapted to slide over the outer cylindrical surface of a vertically upstanding cartridge 44 when such cartridge is in position to receive powder. The spool 42 is held in place in the plate member 40 by means of a setscrew 46. The powder passage defined by the spool 42 is horizontally offset from the passage defined by apertures 34 and 38.

A displaceable powder slide 48 is disposed between and parallel to the plate members 32 and 40 and is provided with a vertically oriented metering aperture 50. Metering aperture 50 defines the powder quantity to be metered into the cartridge 44 and is alternately and cyclically aligned with the passage through apertures 34 and 38 and the passage through spool 42 by means of a vertical control cam 52 mounted on the base 12. Powder slide 48 is formed with a vertical step and accordingly a spacer 53 is disposed between slide 48 and the plate member 32. Spacer 53 contains a vertical aperture 51 which is aligned with apertures 34 and 38.

Powder slide 48, as best shown in FIG. 4, is not connected to the vertical guide pins 22 and 24 which maintain the vertical alignment of the plate members 32 an 40. Accordingly, powder slide 48 is free to displace or slide horizontally between the plate members 32 and 40 under the control of the vertical cam 52. Vertical cam 52 includes first and second offset vertical portions or sections 56 and 58 which are joined by an angled or dogleg portion or section 60. Cam 52 is positively engaged by the follower portion 54 of the powder slide 48 and more specifically, the obliquely oriented following surfaces which are parallel to the surfaces of the inclined cam section 60, such that vertical displacement of the platen assembly 26 causes the powder slide 48 to be horizontally displaced between a first position, in which powder is conveyed from the supply tube 30 to the metering aperture 50, and a second position in which powder is conveyed from the metering aperture 50 to the cartridge 44 through the hollow cylindrical spool 42. The first position is illustrated in FIG. 3 wherein the follower portion 54 of the powder slide 48 engages the rearwardly offset portion 58 of the cam 52. In this position the metering aperture 50 is vertically aligned with the apertures 38, 34 and 51 such that powder from the supply tube 30 may be gravitationally fed to the metering aperture 50. The second position is illustrated in FIG. 2 wherein the follower portion 54 of the powder slide 48 engages the forwardly offset portion 56 of the cam 52 such that the metering aperture 50 is vertically aligned with the passage through the hollow cylindrical spool 42 and the cartridge 44. In this position, powder previously admitted to the metering aperture 50 is gravitationally fed to the cartridge 44.

Vertical displacement of the platen assembly 26 relative to the platform 14 is accomplished by drive means including a motor 61 (FIG. 1) and a connecting rod 62 which is pivotally connected at 64 to the second plate member 40 and a link 68 which is pivotally connected at 66 to the rod 62 and a pivotally connected to a motor driven crankshaft 70. Rotation of shaft 70 by the motor 61 rotates the link 68 thus cyclically and vertically displacing the platen assembly 26 through a distance defined by the length of the link 68.

Referring again to FIGS. 2 and 3, the rearwardly disposed surface of the rearwardly offset portion 58 of cam 52 is provided with a rearwardly opening tapered notch 70. Disposed above the notch 70 and in the opposite surface of the cam 52 is a spring plunger 72 having a spring biased button 74 which protrudes from the forward surface of the cam 52. Spring plunger 72 is preferably of the type having a cylindrical threaded body which may be readily inserted into a tapped hole extending through the cam 52 as shown. The forward portion 56 of cam 52 is similarly provided with a rearwardly opening tapered notch 76 and vertically above the notch a second spring plunger 78 having a spring-biased button 80 which protrudes from the opposite surface of the cam 52 as shown. The vertical distance between the centers of the notches 70 and 76 and the center lines of the spring plungers 72 and 78 are equal.

To coact with the notches 70 and 76 and the buttons 74 and 80 of the spring plungers 72 and 78 respectively, the follower portion 54 of the powder slide 48 is provided with a vertically angulated opening to define first and second oppositely disposed and vertically offset lobes 82 and 84. Lobe 82 is vertically beneath lobe 84 by a distance equal to the vertical distance between the centerline of the notch 70 and the associated spring plunger 72. Accordingly, during vertical displacement of the platen assembly relative to the control cam 52, lobe 84 encounters the button of one of the spring plungers 72 and 78 at the same time lobe 82 encounters one of the tapered notches 70 and 76. The spring plunger tends to bias the lobe 82 into one of the notches during a first increment of displacement. The second increment of displacement of the powder slide 48 relative to the cam 52 drives the lobe back out of the notch by riding up one or the other of the tapered notch surfaces. Such action imparts an abrupt and cyclically repeating axial displacement to the powder slide 48 thereby to cyclically pulsate the powder slide as it resides in the first and second horizontal positions previously defined.

The operation of the machine 10 employing the invention illustrated in FIGS. 1—4 will now be described in detail. Cartridges 44 are metered through the shaft 16 to the platform 14 for the performance of the various steps in the reloading process. As the cartridge reaches the position shown in FIGS. 2 and 3 the platen assembly 26 is continuously driven by the motor 61 through the vertical oscillations provided by the link 68 of the drive linkage assembly. As the link 68 is extended toward the top center position shown in FIG. 3, the plate members 32 and 40 are driven upwardly maintaining proper alignment by coaction with the guide pins 22 and 24. As the follower portion 54, and more specifically, the inclined following surface, of the powder slide 48 passes over the inclined portion 60 of the cam 52, the metering aperture 50 is horizontally displaced toward the first position wherein it is aligned with the apertures 38, 34 and 51. In this position powder is gravitationally conveyed from the supply tube 30 to the metering aperture 50. As the powder slide 48 reaches this first position (FIG. 3), lobe 84 engages the button 74 of the plunger 72 at the same time lobe 82 encounters the notch 70. Accordingly, the upward travel of the platen assembly 26 rapidly horizontally displaces the powder slide 48 to the left as shown in FIG. 3 by a small increment and then, as lobe 82 engages the upper tapered surface of notch 70, the powder slide 48 is abruptly displaced to the right, as shown in FIG. 3. The link 68 then reaches the top center position shown in FIG. 3 and begins to drive the platen assembly 26 downwardly from he position shown in FIG. 3 to the second position shown in FIG. 2. As the downward travel of the platen assembly begins, lobes 82 and 84 again encounter the notch 70 and the button 74, respectively, and again abruptly pulsate the powder slide 48 to insure that the proper quantity of powder is metered into the aperture 50.

The downward travel of the platen assembly 26 continues and the follower portion 54 and its inclined following surface passes over the inclined or dogleg portion 60 of the cam 52 toward the forwardly offset portion 56. In the second position (FIG. 2) the metering aperture 50 is vertically aligned with the passage through the spool 42 thus to be in a position to convey the powder to the cartridge 44. While in this position the continuing downward travel of the platen assembly 26 causes the lobes 82 and 84 to encounter the lower notch 76 and the button 80 of the associated spring plunger 78. Accordingly, a third abrupt pulsation of the powder slide 48 occurs. It can be seen that as the link 68 reaches the bottom center position and continues to rotate thus driving the platen assembly 26 back in the upward direction the lobes 82 and 84 again encounter the notch 76 and the button 80 respectively. Accordingly, a fourth abrupt pulsation of the powder slide 48 is accomplished. The first two pulsations of the powder slide 48 occur during the cycle portion in which the powder slide 48 receives powders from the supply 30 and the last two pulsations occur during the cycle portion in which powder is conveyed from the metering aperture 50 to the cartridge 44. Accordingly, these cyclical and relatively abrupt pulsations of the powder slide 48 ensure that powder is correctly metered into and out of the aperture 50 during the operation of the machine 10. Such pulsations are rapid and abrupt in nature relative to the cyclical horizontal displacement of the powder slide 48 which arises out of the engagement between the follower portion 54 and the axially offset portions 56 and 58 of the cam 52.

It is to be understood that the foregoing description is illustrative in nature and is not to be construed in a limiting sense.

The embodiments of the invention in which an exclusive property or privilege is claimed are defined as follows:

I claim:

1. In an apparatus for metering powder from a supply to a cartridge: support means, a displaceable member having a metering aperture therein, control means for relatively slowly and cyclically displacing the member between a first position wherein powder is conveyed to the aperture from a supply and a second position wherein powder is conveyed from the aperture to a cartridge disposed on the support means, and means on the control means for relatively abruptly and cyclically displacing the member relative to the control means while the member is approximately in each of the first and second positions.

2. Apparatus as defined in claim 1 wherein the control means includes a cam mounted on the support means and having first and second portions defining the first and second positions of the member.

3. Apparatus as defined in claim 2 wherein the cam is substantially vertical, the first and second portions being substantially continuous but horizontally offset from one another, the member having a follower portion engaging the cam, the apparatus including drive means for vertically displacing the member relative to the cam.

4. Apparatus as defined in claim 3 wherein said means on the control means includes first and second notches in the first and second portions of the cam, respectively, and bias means for urging the follower portion into the notches as the member is displaced relative to the cam.

5. Apparatus as defined in claim 4 wherein the bias means includes first and second spring plungers disposed in the cam opposite the first and second notches, respectively.

6. Apparatus as defined in claim 5 wherein the follower portion of the member includes first and second opposite and vertically offset lobes for engaging the cam, the notches and spring plungers of the cam being vertically offset such that the first lobe encounters a spring plunger as the second lobe encounters a notch.

7. In an apparatus for metering powder from a supply to a cartridge, support means, a first member movable relative to the support means and having a first substantially vertically extending aperture for conveying powder, a second member movable with the first member and having a second substantially vertically extending aperture for conveying powder, the first and second apertures being horizontally offset from one another, a slide member disposed between the first and second members and horizontally displaceable relative thereto, the slide member having a third substantially vertically extending aperture for conveying powder, control means on the support means for relatively slowly and cyclically displacing the slide member relative to the first and second members between a first position wherein the first and third apertures are aligned and a second position wherein the second and third apertures are aligned, and means on the control means for relatively abruptly and cyclically displacing the slide member relative to the control means while the slide member is in each of the first and second positions.

8. Apparatus as defined in claim 7 wherein the control means includes a cam vertically disposed on the support means and having first and second horizontally offset portions defining the first and second positions of the slide member, respectively, said slide member having a follower portion engaging the cam.

9. Apparatus as defined in claim 8 including drive means for vertically displacing the slide member and the first and second members relative to the cam.

10. Apparatus as defined in claim 9 wherein said means on the control means includes first and second notches in the first and second portions of the cam, respectively, and bias means for urging the follower portion into the notches as the member is displaced relative to the cam.

11. Apparatus as defined in claim 10 wherein the bias means includes first and second spring plungers disposed in the cam opposite the first and second notches, respectively.

12. Apparatus as defined in claim 11 wherein the follower portion of the member includes first and second opposite and vertically offset lobes for engaging the cam, the notches and spring plungers of the cam being vertically offset such that the first lobe engages a spring plunger as the second lobe encounters a notch.

13. Apparatus as defined in claim 7 including at least one vertical guide pin mounted on the support means and engaging the first and second members during the vertical displacement thereof.

14. Apparatus as defined in claim 7 including a powder supply tube mounted on the first member and communicating with the first aperture.

15. Apparatus as defined in claim 7 including a cartridge receiving spool mounted on the second member and communicating with the second aperture.

16. Apparatus as defined in claim 9 wherein the drive means includes a motor, a crank connected to the motor and rotated thereby and a connecting rod connected between the crank and the second member to impart a cyclic vertical displacement thereto.

17. In an apparatus for the loading of ammunition; a first assembly, a second assembly, means for imparting a cyclical and vertical relative displacement between the assemblies, a slide member disposed in a horizontally displaceable relation on the first assembly, at least one substantially vertical cam on the second assembly, the cam having first and second horizontal offset, vertical legs connected by an obliquely oriented inclined section, the slide member having a follower portion engaging the cam to be positively driven by the cam such that said slide member follows the cam along the first and second legs and the inclined section thereby reciprocally placing the member in first and second operating positions during each vertical displacement cycle of the first assembly.

18. Apparatus as defined in claim 17 wherein the slide member includes two vertically offset cam-following lobes which are spaced apart horizontally to correspond to the cam thickness and at opposite ends of obliquely oriented cam following surfaces, said surfaces being parallel and corresponding to the oblique angle of the inclined cam section, such that one of the following surfaces engages the inclined cam section on the upstroke of the vertical displacement cycle thereby forcing the slide member into its first position while the other following surface engages the inclined cam section on the downstroke of the vertical displacement similarly forcing the slide member into its second position.

19. Apparatus as defined in claim 17 wherein the first assembly is a platen assembly comprising first and second plate members and a spacer between said first and second members to define a passageway, said passageway permitting horizontal displacement of the slide member during the cyclical vertical displacement of the platen assembly, and the second assembly is a base.

20. Apparatus as defined in claim 18 wherein said means for imparting includes a motor-driven crank in said base and rotating a connecting rod connected between the crank and the second plate member.

21. Apparatus as defined in claim 19 wherein the slide member includes a material metering aperture and two vertically offset cam-following lobes which are spaced apart horizontally to correspond to the cam thickness and at opposite ends of obliquely oriented cam following surfaces, said surfaces being parallel and corresponding to the oblique angle of the inclined cam section, such that one of the following surfaces engages the inclined cam section on the upstroke of the vertical platen assembly displacement thereby forcing the material metering slide member into its first position while the other following surface engages the inclined cam section on the downstroke of the vertical displacement similarly forcing the material metering slide member into its second position.

22. Apparatus as defined in claim 17 wherein the first and second vertical legs are horizontally offset by the obliquely oriented inclined section, by the distance desired for the horizontal displacement of the material-metering slide member.